United States Patent Office 3,008,797

Patented Nov. 14, 1961

3,008,797

TERNARY SELENIDES AND TELLURIDES OF SILVER AND ANTIMONY AND THEIR PREPARATION

Tom A. Bither, Jr., Wilmington, Del., assignor to E. I. du Pont de Nemours and Company, Wilmington, Del., a corporation of Delaware No Drawing. Filed Oct. 10, 1957, Ser. No. 689,258
6 Claims. (Cl. 23—14)

This invention relates to new compositions of matter useful as semi-conductors. More particularly, the invention is directed to novel ternary selenides and tellurides of silver and antimony and to their preparation.

In recent years the field of electronics has made spectacular strides. As a result, research interest in semiconductors and in their use in crystal rectifiers, transistors, and photoconductive and thermoelectric devices has been greatly stimulated. Notwithstanding the industrial progress which has been made in this field, there is still need for better and lower cost semi-conductors. Currently, ultrahigh purity silicon and germanium are the only materials which are being promoted commercially for application in semi-conductor fields. However, silicon of the degree of purity required for many applications is costly and difficult to produce; and neither germanium nor silicon possesses the best combination of properties for all recognized semi-conductor applications such as, for example in thermo-electric devices.

Accordingly, an object of this invention is to provide novel semi-conductors possessing a combination of properties which make them suitable for many of the known semi-conductor uses and which are readily produced, low in cost, and made from abundantly available materials. A further object is to provide a method for preparing such novel semi-conductors. Another object is to provide novel ternary compounds possessing a combination of carrier mobility, thermal conductivity, and thermoelectric power which makes them especially suitable for interconverting heat and electrical energies. Other objects will appear hereinafter.

These and other objects are accomplished by the present invention of ternary silver-antimony selenides and tellurides corresponding in composition to the formula $AgSbX_2$, wherein X is selected from the class consisting of selenium and tellurium.

The ternary selenides and tellurides of silver and antimony of this invention are conveniently prepared by fusing together the component elements, that is, silver, antimony, and a group VI–A element of atomic number 34–52, under a blanket of an inert gas for a period of from 2 to 30 hours. The reaction temperature should be in the range of 300° to 1200° C. Generally, however, it is preferred to employ temperatures above 350° C. in order to increase reaction rate and hence decrease time of reaction, and below 1000° C. to minimize any tendency of the formed selenides or tellurides to decompose. Since the best balance of reaction rate with yield of desired products is realized within the range of 400° to 1000° C. this embraces the temperature conditions generally employed.

In preparing the ternary compounds of this invention the silver and antimony are mixed in such proportions as to provide a gram atom ratio of 1:1. The selenium or tellurium is provided in amount such as to have in the final composition at least two gram atoms per gram atom of silver. These proportions can be obtained (1) by using preformed selenides or tellurides of silver and antimony, (2) by mixing the selenium or tellurium with silver and antimony, or (3) by reacting hydrogen selenide or telluride with silver and antimony, or with the oxides or hydrous oxides of these metals.

The ternary selenides and tellurides of silver and antimony of this invention can be made at atmospheric pressure, or in closed reactors under autogenous pressure. They can also be made under super-pressures provided by an inert gas such as argon.

The ternary selenides or tellurides of silver and antimoney of this invention are useful in such devices as crystal rectifiers, transistors, and in thermoelectric and other semiconductor devices.

The periodic table referred to in this specification is that published in Deming's "General Chemistry," 5th Ed., John Wiley & Sons.

The examples which follow illustrate but do not limit this invention. The X-ray diffraction data given therein were obtained by the Debye-Scherrer powder method with a North American Philips unit, using copper Kα-radiation filtered through nickel to give an effective wave length of 1.542 A. units. In this method the sample is finely ground and packed into a capillary tube, which is mounted in a camera having a 114.9 mm. diameter.

In the tabulations of the diffraction data, the heading "I" refers to the observed intensity values and "*d*" to the interplanar spacings expressed in angstrom (A.) units. The letter S designates the strongest line recorded; $M_1$, $M_2$, $M_3$ and $M_4$ are lines of medium intensity, the order of intensity decreasing with increasing numerical sequence; F means that the line is faint; and V that it is very weak.

EXAMPLE I

A mixture of 1.08 g. of silver (0.01 mole), 1.22 g. of antimony (0.01 mole), and 2.55 g. of tellurium (0.02 mole) was heated under 1 atmosphere of argon for 7.75 hours to 938° C. and then allowed to cool to room temperature. The reactants had fused to a silvery, metallic-appearing, crystalline mass. An X-ray diffraction powder pattern of this material, after subtraction of a trace amount of silver telluride, showed the presence of a new phase. The crystal structure of this new phase was identified as the cubic sodium chloride type with a value of $a_0$ equal to 6.09 A. The X-ray diffraction pattern is tabulated below:

*X-ray pattern—$AgSbTe_2$*

| I | d |
|---|---|
| V | 3.52 |
| S | 3.05 |
| S– | 2.15 |
| V | 1.83 |
| $M_2$ | 1.76 |
| $M_3$ | 1.52 |
| V | 1.39 |
| $M_1$ | 1.36 |
| $M_2$ | 1.24 |
| V | 1.170 |
| F | 1.078 |
| V | 1.035 |
| $M_4$ | 1.016 |
| $M_4$ | 0.963 |
| $M_4$– | 0.919 |
| V | 0.879 |
| $M_4$– | 0.844 |
| $M_4$ | 0.814 |

This pattern has no counterpart in the ASTM (American Society for Testing Materials) file of known X-ray diffraction data.

Analysis indicated the composition to correspond to $AgSbTe_2$.

*Analysis.*—Calc'd for $AgSbTe_2$: Ag, 22.25; Sb, 25.11; Te, 52.64. Found: Ag, 22.58; Sb, 25.01; Te, 52.17.

X-ray diffraction powder patterns run on melt fusions of the blends 3Ag/Sb/3Te, ($3Ag_2Te/Sb_2Te_3$) and Ag/3Sb/5Te, ($Ag_2Te/3Sb_2Te_3$) showed mixtures of $AgSbTe_2$ plus $Ag_2Te$ and $AgSbTe_2$ plus $Sb_2Te_3$.

Thermal analysis indicated that the compound $AgSbTe_2$ melted congruently at approximately 563° C.

*Single crystal of* $AgSbTe_2$.—A single crystal of $AgSbTe_2$ was grown from the melt by lowering an ingot of $AgSbTe_2$ sealed in an evacuated quartz tube through a fixed thermal gradient at the rate of 16 inches/day. The gradient was in the order of 25–35° C./inch with a maximum temperature of 623° C.

*Characterization of* $AgSbTe_2$.—The following properties were determined on sections of the above-described single crystal of $AgSbTe_2$:

Resistivity: 0.008 ohm. cm.
Thermoelectric power: 300 $\mu$v./° C., the hot junction being negative.
Hall coefficient: −11.6 $cm.^3$/coulomb, using the sign convention given by Equation 5*b*–283 on page 5–98 of the American Institute of Physics Handbook (McGraw-Hill, 1957).
Thermal conductivity at 25° C.: 0.080 watts./cm. ° C.
Energy gap (infrared): 0.1 e.v.

A mixture of 1.08 g. of silver (0.01 mole), 1.22 g. of antimony (0.01 mole), and 1.58 g. of selenium (0.02 mole) was heated under 1 atmosphere of argon for 8 hours to 950° C. and then allowed to cool to room temperature. The reactants had fused to a silvery, metallic-appearing crystalline mass. An X-ray diffraction powder pattern of this material, after subtraction of trace amounts of silver selenide and antimony, showed the presence of a new phase. The X-ray diffraction data are tabulated below:

*X-ray pattern*—$AgSbSe_2$

| I | *d* |
|---|---|
| $M_2$ | 3.35 |
| S | 2.90 |
| S— | 2.05 |
| $M_4$ | 1.75 |
| $M_1$ | 1.67 |
| $M_3$ | 1.45 |
| V | 1.33 |
| $M_1$ | 1.30 |
| $M_2$ | 1.18 |
| V | 1.115 |
| F | 1.025 |
| $M_4$ | 0.967 |
| F | 0.917 |

This pattern finds no counterpart in the ASTM file of known X-ray diffraction data.

The crystal structure of this new phase was identified as the cubic sodium chloride type with a value of $a_0$ equal to 5.80 A. Analysis indicated the composition to correspond to $AgSbSe_2$.

*Analysis.*—Calc'd for $AgSbSe_2$: Ag, 27.84; Sb, 31.42; Se, 40.75. Found: Ag, 27.91; Sb, 30.95; Se, 40.98.

X-ray diffraction powder patterns run on melt fusions of the blends 3Ag/Sb/3Se, ($3Ag_2Se/Sb_2Se_3$) and Ag/3Sb/5Se, ($Ag_2Se/3Sb_2Se_3$) showed mixtures of $AgSbSe_2$ plus $Ag_2Se$ and $AgSbSe_2$ plus $Sb_2Se_3$.

Thermal analysis indicated that the compound $AgSbSe_2$ melted congruently at approximately 632° C.

*Single crystal of* $AgSbSe_2$.—A single crystal was melt grown in the manner described for $AgSbTe_2$. The maximum temperature of the gradient was 708° C.

*Characterization of* $AgSbSe_2$.—The following properties were determined on sections of the above-described single crystal of $AgSbSe_2$:

Energy gap (infrared): 0.74±0.02 e.v.
Resistivity: 94.5 ohm.-cm.
Thermoelectric power: 670 $\mu$v./° C., the hot junction being negative.
Hall coefficient: −4100 $cm.^3$/coulomb, the sign convention being the same as in Example I.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. A ternary compound corresponding to the formula $$AgSbX_2$$

wherein X is a member of the group consisting of selenium and tellurium.

2. Silver antimony selenide represented by the formula $$AgSbSe_2$$

3. Silver antimony telluride represented by the formula $$AgSbTe_2$$

4. Process for preparing a ternary compound corresponding to the formula $$AgSbX_2$$

wherein X is a member of the group consisting of selenium and tellurium, which comprises heating for a period of from two to thirty hours at a temperature within the range of 300° to 1200° C. silver and antimony in contact with an element selected from the group consisting of selenium and tellurium, said silver, antimony and said element being present in the reaction mixture in such proportions as to provide in the resultant compound a gram atom ratio of silver:antimony:said element of 1:1:2.

5. Process for preparing a ternary compound corresponding to the formula $$AgSbX_2$$

wherein X is a member of the group consisting of selenium and tellurium, which comprises heating for a period of from 2 to 30 hours at a temperature within the range of 400° to 1000° C. silver and antimony in contact with an element selected from the group consisting of selenium and tellurium, said silver, antimony and said element being present in the reaction mixture in such proportions as to provide in the resultant compound a gram atom ratio of silver:antimony: said element of 1:1:2, and then cooling the resulting ternary compound.

6. Process for preparing a ternary compound corresponding to the formula $$AgSbX_2$$

wherein X is a member of the group consisting of selenium and tellurium, which comprises heating for a period of from 2 to 30 hours at a temperature within the range of 400° to 1000° C. and under superatmospheric pressure, said pressure being provided by an inert gas, silver and antimony in contact with an element selected from the group consisting of selenium and tellurium, said silver, antimony and said element being present in the reaction mixture in such proportions as to provide in the resultant compound a gram atom ratio of silver:antimony: said element of 1:1:2, and then cooling the resulting ternary compound.

References Cited in the file of this patent

UNITED STATES PATENTS

| | | |
|---|---|---|
| 2,602,095 | Faus | July 1, 1952 |
| 2,728,637 | Alderson et al. | Dec. 27, 1955 |
| 2,770,528 | Maynard | Nov. 13, 1956 |
| 2,882,467 | Wernick | Apr. 14, 1959 |
| 2,882,468 | Wernick | Apr. 14, 1959 |

OTHER REFERENCES

Graham in "Chemical Abstracts," vol. 47, col. 7953(H) 1953.

Hoffman: Lexikon de Inorgan. Verbindungen: Band I, 2 Halfte Quecksilber Bar No. 32–55, page 1205 (1919).